United States Patent
Shih

(10) Patent No.: US 7,338,824 B2
(45) Date of Patent: Mar. 4, 2008

(54) METHOD FOR MANUFACTURING FFS MODE LCD

(75) Inventor: Po-Sheng Shih, Tao-Yuan-Hsien (TW)

(73) Assignee: HannStar Display Corp., Tao-Yuan Hsien (TW)

( * ) Notice: Subject to any disclaimer, the term of this patent is extended or adjusted under 35 U.S.C. 154(b) by 300 days.

(21) Appl. No.: 11/222,634

(22) Filed: Sep. 9, 2005

(65) Prior Publication Data

US 2007/0059855 A1    Mar. 15, 2007

(51) Int. Cl.
*H01L 33/00*    (2006.01)

(52) U.S. Cl. ............ 438/30; 438/34; 438/129; 438/599; 438/609; 257/E33.065

(58) Field of Classification Search ........... 438/30, 438/34, 129, 599, 609; 257/E33.065
See application file for complete search history.

(56) References Cited

U.S. PATENT DOCUMENTS

| | | | |
|---|---|---|---|
| 2006/0146212 A1* | 7/2006 | Ahn et al. | 349/42 |
| 2006/0285050 A1* | 12/2006 | Yoo et al. | 349/141 |
| 2006/0290867 A1* | 12/2006 | Ahn et al. | 349/141 |
| 2007/0002249 A1* | 1/2007 | Yoo et al. | 349/141 |

* cited by examiner

*Primary Examiner*—George Fourson
(74) *Attorney, Agent, or Firm*—Volpe and Koenig, PC

(57) ABSTRACT

In the present invention, a method for manufacturing a liquid crystal display is provided. The method includes steps of providing a substrate, forming a first metal layer on the substrate, etching the first metal layer to form a plurality of gate lines on the substrate, forming a common electrode on the substrate, forming a second metal layer on the substrate, etching the second metal layer to form a first electrode, a second electrode, a common line and a plurality of data lines on the substrate, and forming a pixel electrode overlapping the common electrode, wherein the gate lines intersect the data lines to form at least one enclosed area, the common electrode and the pixel electrode are positioned in the enclosed area, the first electrode is connected to the pixel electrode and the second electrode is connected to the data lines.

15 Claims, 14 Drawing Sheets

METHOD FOR MANUFACTURING FFS MODE LCD

FIELD OF THE INVENTION

The present invention relates to a method for manufacturing the LCD, and more particularly to a method for manufacturing the FFS mode LCD.

BACKGROUND OF THE INVENTION

In the current display industry, the liquid crystal display (LCD) has gradually replaced the cathode ray tube (CRT) to become a mainstream product due to its excellent properties of low radiation and low power consumption. In the array structure of LCD, the FFS (Fringe Field Switching) mode is a promising structure owing to its high transmittance, wide viewing angle and low color shift.

Please refer to FIG. 1(a), which shows a top view of the array structure of the FFS mode LCD in the prior art. The FFS mode LCD includes a common electrode 12, a pixel electrode 110, a plurality of gate lines 13, a common line 111, a plurality of data lines 17 and a contact hole 19.

Please refer to FIG. 1(b), which shows a cross-sectional view along A-A line of FIG. 1(a). As shown in FIG. 1(b), the manufacturing steps of the FFS mode LCD are as follows. Firstly, a substrate 11 is provided and the common electrode 12 is formed thereon as shown in FIG. 1(a). Then, a first metal layer is applied on the substrate 11, and the gate lines 13 and the common line 111 are formed simultaneously by etching the first metal layer, wherein the common line 111 directly contacts the common electrode 12 as shown in FIG. 1(c). Subsequently, a gate insulating layer 14 is formed on the substrate 11 and covers the gate lines 13 and the common line 111. Next, a channel portion 15 and a doped portion 16 are formed on the gate insulating layer 14 and correspond to one of the gate lines 13, and a second metal layer covering the whole substrate 11 are sequentially formed on the gate insulating layer 14. The data lines 17, a source electrode 171 and a drain electrode 172 are formed simultaneously by etching the second metal layer. After that, a passivation layer 18 is formed on the data lines 17, the source electrode 171, the drain electrode 172 and a part of the gate insulating layer 14, and covers the whole substrate 11. Then, the passivation layer 18 is etched to form a contact hole 19 on the source electrode 171. Finally, the pixel electrode 110 is formed on the passivation layer 18 and covers the contact hole 19.

The cross-sectional view along B-B line of FIG. 1(a) is shown in FIG. 1(c). As shown in FIG. 1(c), there are two dielectric layers, i.e. the gate insulating layer 14 and the passivation layer 18, interposed between the common electrode 12 and the pixel electrode 110 of the conventional array structure. The common line 111 is interposed between the gate insulating layer 14 and the common electrode 12. The driving voltage becomes unbalanced between the odd (positive) frame and the even (negative) frame due to the thick dielectric layers, which in turn give rise to the image sticking.

From the above description, it is known that how to develop a method for manufacturing the FFS mode LCD with less dielectric layers has become a major problem to be solved. In order to overcome the drawbacks in the prior art, an improved method for manufacturing the FFS mode LCD is provided. The particular design in the present invention not only solves the problems described above, but also is easy to be implemented. Thus, the invention has the utility for the industry.

SUMMARY OF THE INVENTION

In accordance with one aspect of the present invention, a method for manufacturing the FFS mode LCD is provided. The provided method is able to reduce the number of dielectric layers between the common electrode and the pixel electrode on the LCD, and thus the image sticking is reduced accordingly.

In accordance with another aspect of the present invention, a method for manufacturing a liquid crystal display is provided. The method includes steps of providing a substrate, forming a first metal layer on the substrate, etching the first metal layer to form a plurality of gate lines on the substrate, forming a common electrode on the substrate, forming a second metal layer on the substrate, etching the second metal layer to form a first electrode, a second electrode, a common line and a plurality of data lines on the substrate, and forming a pixel electrode overlapping the common electrode, wherein the gate lines intersect the data lines to form at least one enclosed area, the common electrode and the pixel electrode are positioned in the enclosed area, the first electrode is connected to the pixel electrode and the second electrode is connected to the data lines.

Preferably, the liquid crystal display is a fringe field switching liquid crystal display.

Preferably, the common electrode and the pixel electrode are transparent.

Preferably, the method further includes a step of forming a gate insulating layer covering the gate lines and the substrate.

Preferably, the common electrode is formed on the gate insulating layer.

Preferably, the common line is positioned between the common electrode and the gate insulating layer.

Preferably, the common line is parallel with the data lines.

Preferably, the method further includes a step of forming a passivation layer positioned between the common electrode and the pixel electrode.

Preferably, the common line is interlaid between the passivation layer and the common electrode.

Preferably, the method further includes a step of forming a channel portion on one of the gate lines.

Preferably, the method further includes a step of forming a first doped portion and a second doped portion on the channel portion simultaneously.

Preferably, the first doped portion is positioned between the first electrode and the channel portion, and the second doped portion is positioned between the second electrode and the channel portion.

Preferably, the method further includes a step of forming a contact hole for connecting the transparent pixel electrode with the first electrode.

Preferably, the method further includes steps of forming a semiconductor layer and a doped layer on the gate insulating layer and the substrate, forming a channel portion and a doped portion on one of the gate lines by etching the semiconductor layer and the doped layer sequentially, forming a first ITO layer on the doped portion and the gate insulating layer, forming the second metal layer on the first ITO layer, forming a photo resistance layer on the second metal layer, and totally etching a first pre-determined position of the photo resistance layer and partially etching a second pre-determined position of the photo resistance layer via a half-tone technology process.

Preferably, the method further includes a step of etching the first pre-determined position of the second metal layer and the first ITO layer to form the first electrode, the second electrode, and the common electrode, wherein the first pre-determined position is corresponding to one of the gate lines.

Preferably, the method further includes a step of partially removing the photo resistance layer via a photo resistance ashing process, wherein the remained photo resistance layer is corresponding to the first electrode, the second electrode, and the common line.

Preferably, the method further includes steps of etching the doped portion to form a first doped portion corresponding to the first electrode and a second doped portion corresponding to the second electrode, and etching the second metal layer to form the common line.

Preferably, the method further includes steps of removing the remained photo resistance layer, forming a passivation layer all over the substrate, forming a contact hole by etching a third pre-determined position of the passivation layer, forming a second ITO layer all over the substrate, and etching the second ITO layer to form the pixel electrode.

Preferably, the method further includes a step of etching the doped portion to form a first doped portion corresponding to the firs electrode and a second doped portion corresponding to the second electrode.

Preferably, the method further includes a step of partially removing the photo resistance layer via a photo resistance ashing process, wherein the remained photo resistance layer is corresponding to the first electrode and the second electrode, and the common line is remained.

Preferably, the method further includes a step of etching the second metal layer to form the common line.

Preferably, the method further includes steps of removing the remained photo resistance layer, forming a passivation layer all over the substrate, forming a contact hole by etching a third pre-determined position of the passivation layer, forming a second ITO layer all over the substrate, and etching the second ITO layer to form the pixel electrode.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In order to reduce the number of dielectric layers between the common electrode and the pixel electrode on the LCD so as to further decrease the image sticking, practical methods are provided by the present invention to achieve the above object.

Embodiment I

Figure 1A:
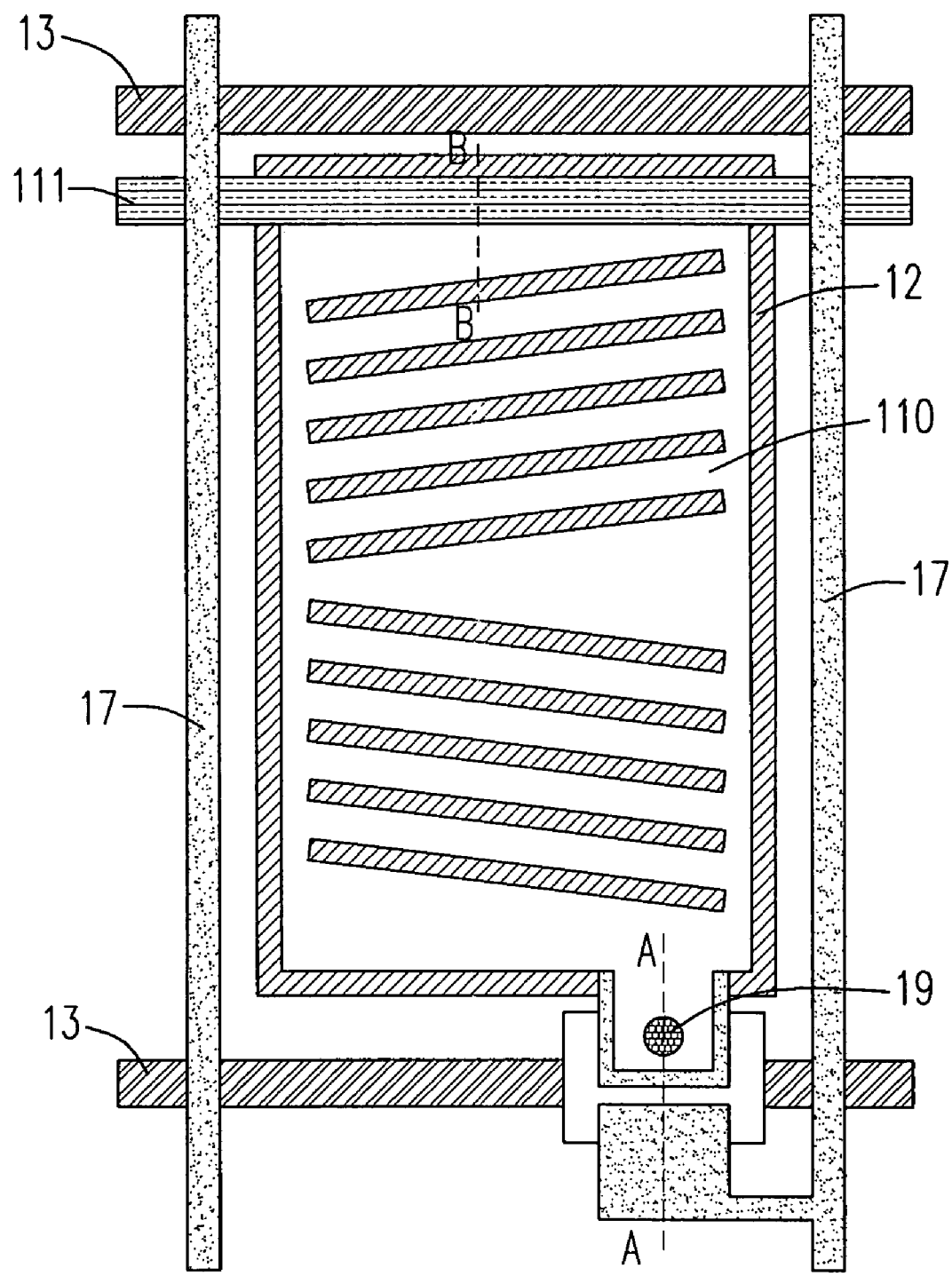
FIG. 1(a) is a top view of the array structure of the FFS mode LCD in the prior art.
Figure 1B:
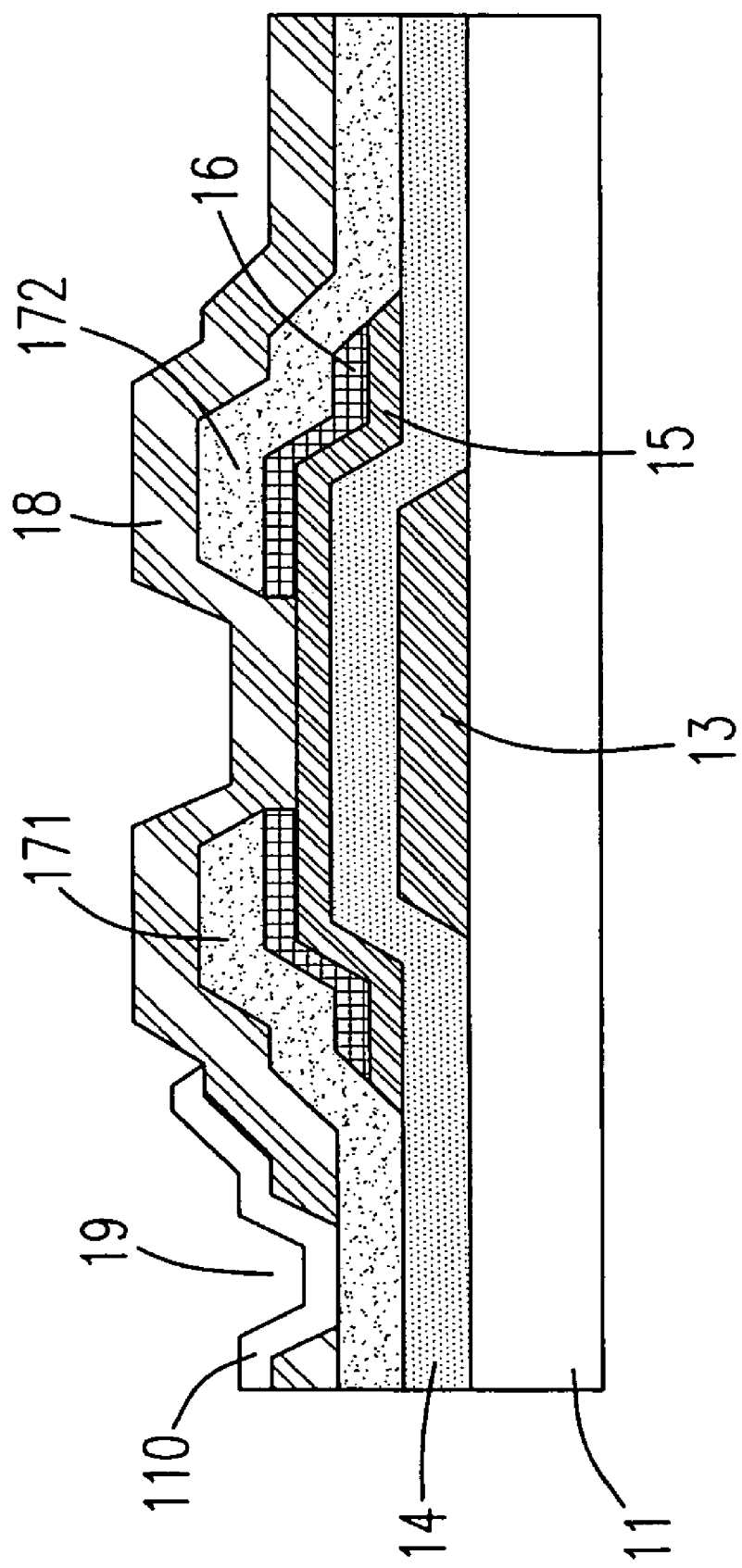
FIG. 1(b) is a cross-sectional view along A-A line of FIG. 1(a)
Figure 1C:
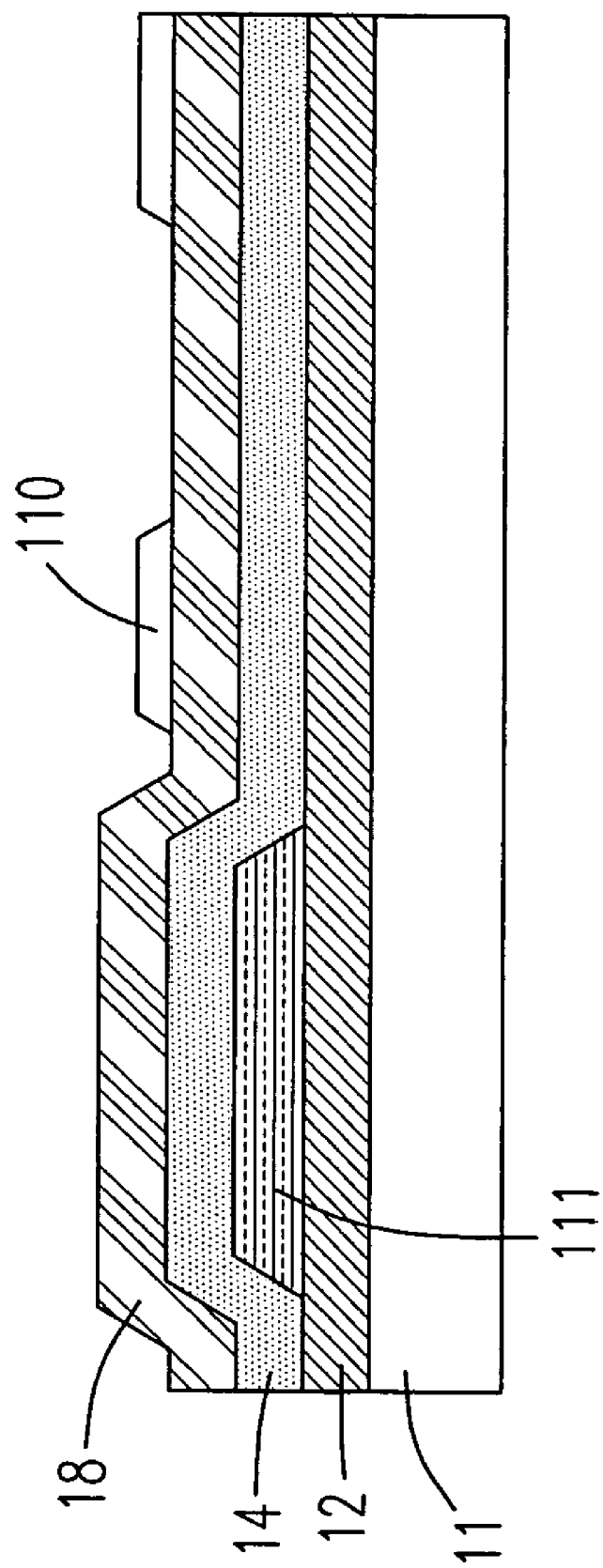
FIG. 1(c) is a cross-sectional view along B-B line of FIG. 1(a)
Figure 2A:
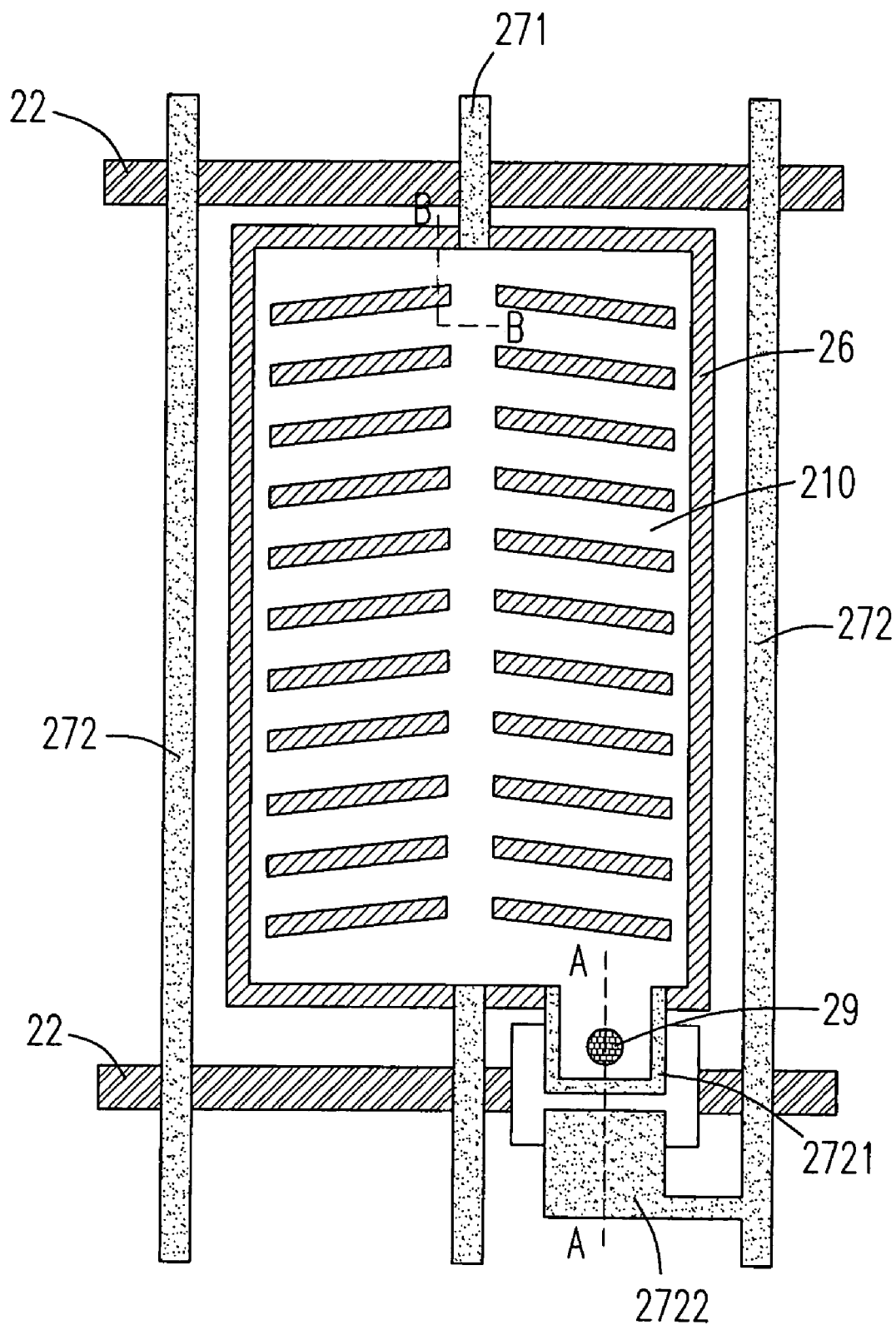
FIG. 2(a) is a top view of the array structure of the FFS mode LCD according to a first preferred embodiment of the present invention.

Please refer to FIG. 2(a), which shows a top view of the array structure of the FFS mode LCD according to a first preferred embodiment of the present invention. The FFS mode LCD has a plurality of pixels, wherein each pixel is surrounded by a plurality of gate lines 22 and a plurality of data lines 272, and includes a common electrode 26, a pixel electrode 210 with a plurality of openings, a common line 271 parallel to the data lines 272 and a contact hole 29.

Figure 2B:
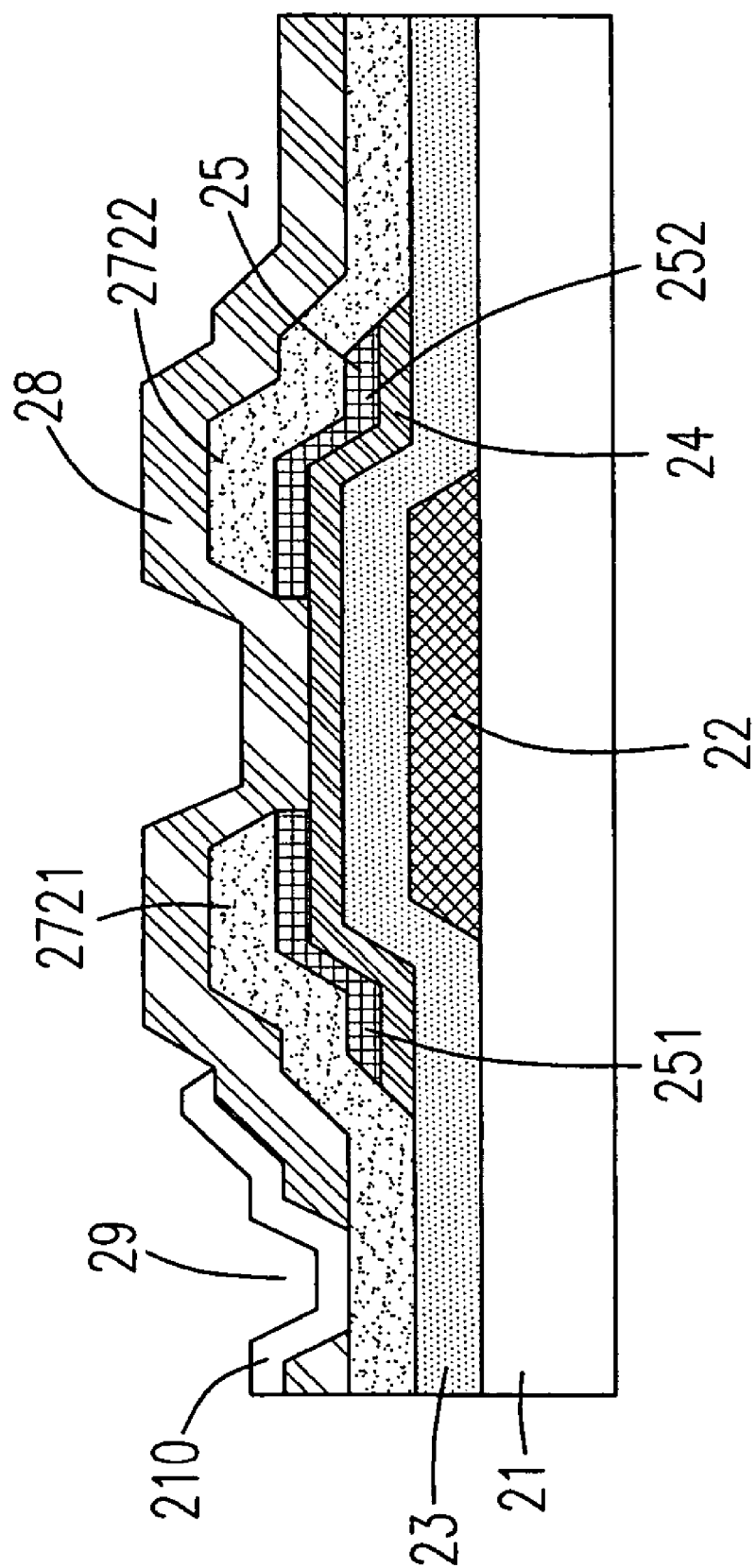
FIG. 2(b) is a cross-sectional view along A-A line of FIG. 2(a)

Please refer to FIG. 2(b), which shows a cross-sectional view along A-A line of FIG. 2(a). As shown in FIG. 2(b), the manufacturing steps of the FFS mode LCD are as follows. Firstly, a substrate 21 is provided and a first metal layer is applied thereon. Subsequently, the first metal layer is etched to form a plurality of gate lines 22, and then a gate insulating layer 23 is applied which covers the gate lines 22 and a part of the substrate 21. Next, a channel portion 24 and a doped portion 25 are sequentially formed on the gate insulating layer 23, wherein the doped portion 25 includes a first doped portion 251 and a second doped portion 252. After that, a first electrode 2721 and a second electrode 2722 are formed on the first doped portion 251 and the second doped portion 252 respectively, wherein the first electrode 2721 can be a source electrode and the second electrode 2722 can be a drain electrode. Next, a passivation layer 28 is formed on the first electrode 2721, the second electrode 2722 and the whole substrate 21, and then it is etched to form the contact hole 29 on the first electrode 2721. Finally, the pixel electrode 210 is formed on the passivation layer 28 and covers the contact hole 29 to connect the first electrode 2721.

Figure 2C:
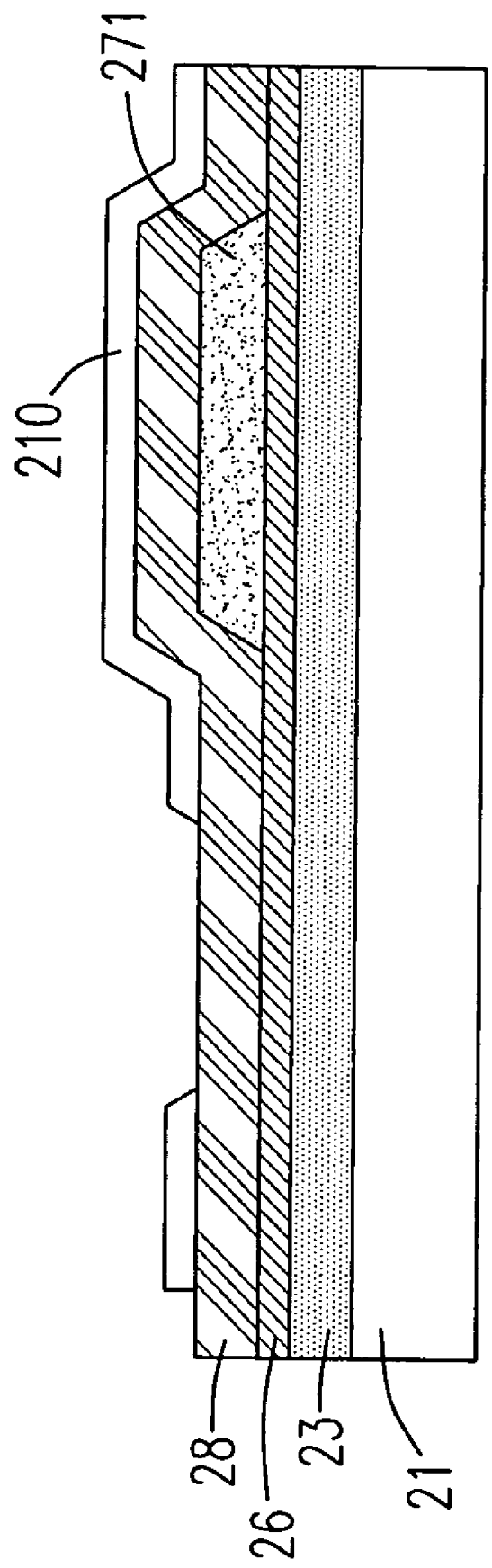
FIG. 2(c) is a cross-sectional view along B-B line of FIG. 2(a)

The cross-sectional view along B-B line of FIG. 2(a) is shown in FIG. 2(c). From the above description, it is known that only one dielectric layer, i.e. the passivation layer 28, is interposed between the common electrode 26 and the pixel electrode 210 on the LCD, and the common line 271 is disposed between the passivation layer 28 and the common electrode 26, so that the image sticking is reduced accordingly. In this embodiment, the common electrode 26 and the pixel electrode 210 are made of the transparent conductor such as ITO.

Embodiment II

Figure 3A:
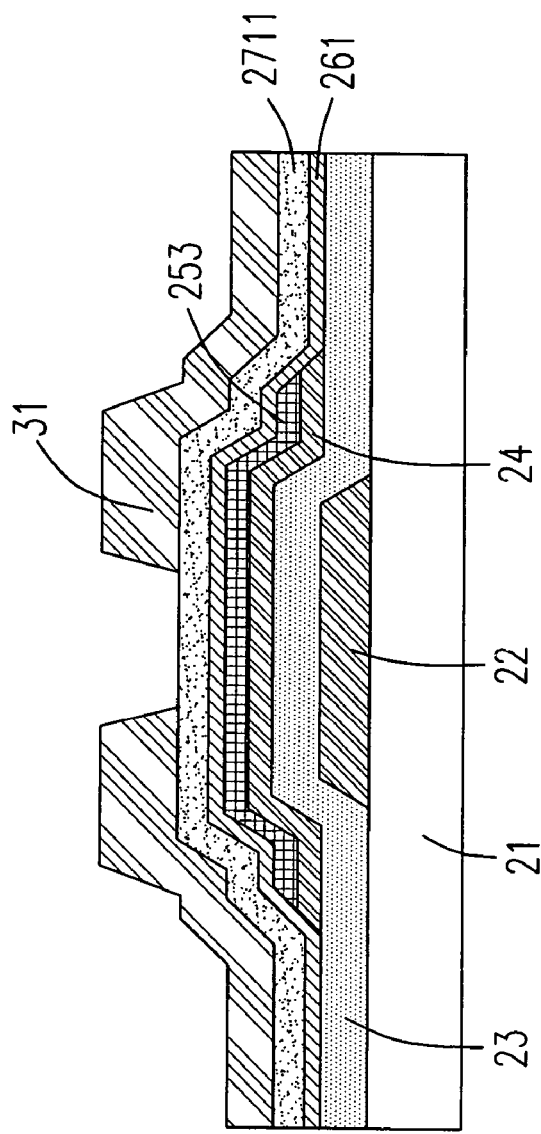
FIGS. 3(a)-3(e) show the processes for defining the common electrode and the data lines simultaneously through the half-tone technology according to a second preferred embodiment of the present invention.

Please refer to FIGS. 3(a)-3(e), which show the processes for defining the common electrode and the data lines simultaneously through the half-tone technology according to a second preferred embodiment of the present invention. As shown in FIG. 3(a), firstly, a semiconductor layer and a doped layer are sequentially formed on the gate insulating layer 23 and the substrate 21. Then, the semiconductor layer and the doped layer are sequentially etched to form a channel portion 24 and a doped portion 253 on one of the gate lines 22. Next, a first ITO layer 261 is formed on the doped portion 253 and the gate insulating layer 23, and then a second metal layer 2711 is formed on the first ITO layer 261. After that, a photo resistance layer 31 is formed on the second metal layer 2711, and then a first pre-determined position of the photo resistance layer 31 is totally etched and a second pre-determined position of the photo resistance layer 31 is partially etched via the half-tone technology process.

Figure 3B:
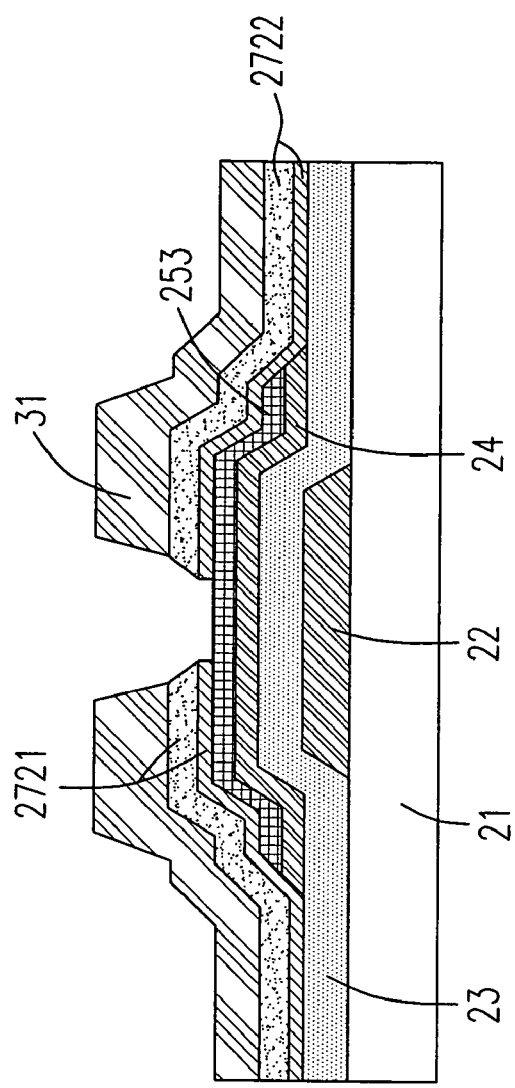

As shown in FIG. 3(b), the first pre-determined position of the second metal layer 2711 and the first ITO layer 261 is etched to form the first electrode 2721, the second electrode 2722 and the common electrode 26 as shown in FIG. 2(c), wherein the first pre-determined position is corresponding to one of the gate lines 22.

Figure 3C:
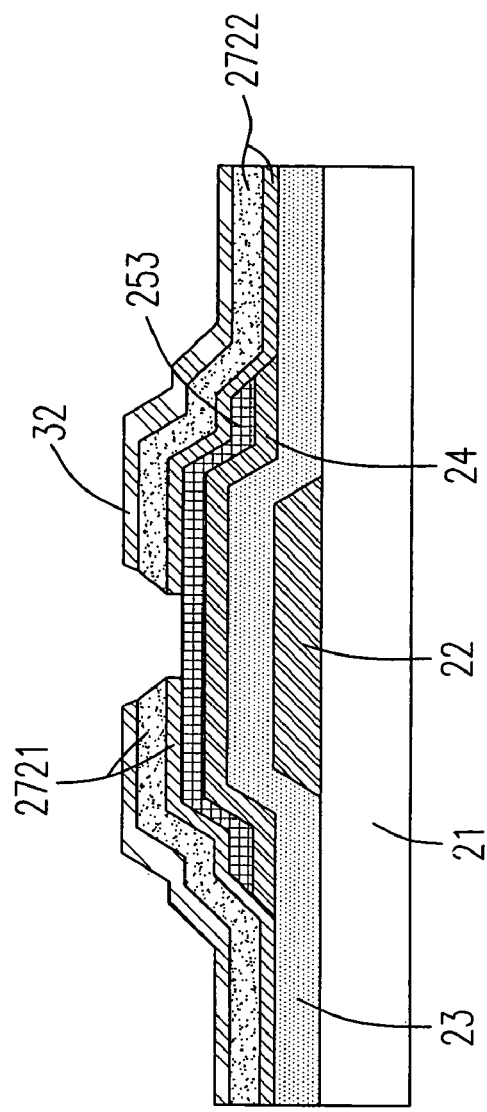

As shown in FIG. 3(c), the photo resistance layer 31 is partially removed via a photo resistance ashing process, wherein the remained photo resistance layer 32 is corresponding to the first electrode 2721, the second electrode 2722 and the predetermined position of the common line 271.

Figure 3D:
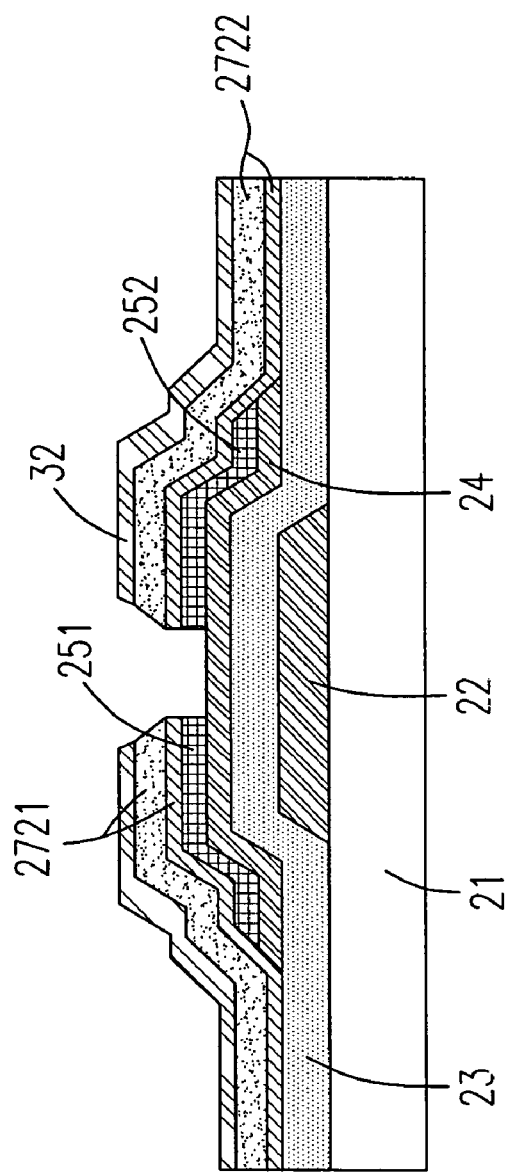
Figure 3D:
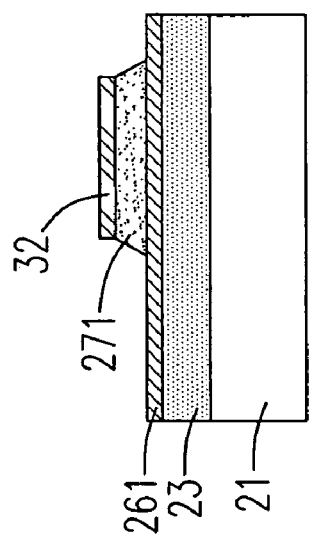

As shown in FIG. 3(d), firstly, the doped portion 253 is etched to form a first doped portion 251 corresponding to the first electrode 2721 and a second doped portion 252 corresponding to the second electrode 2722. Then, the second metal layer 2711 is etched to form the common line 271.

Figure 3E:
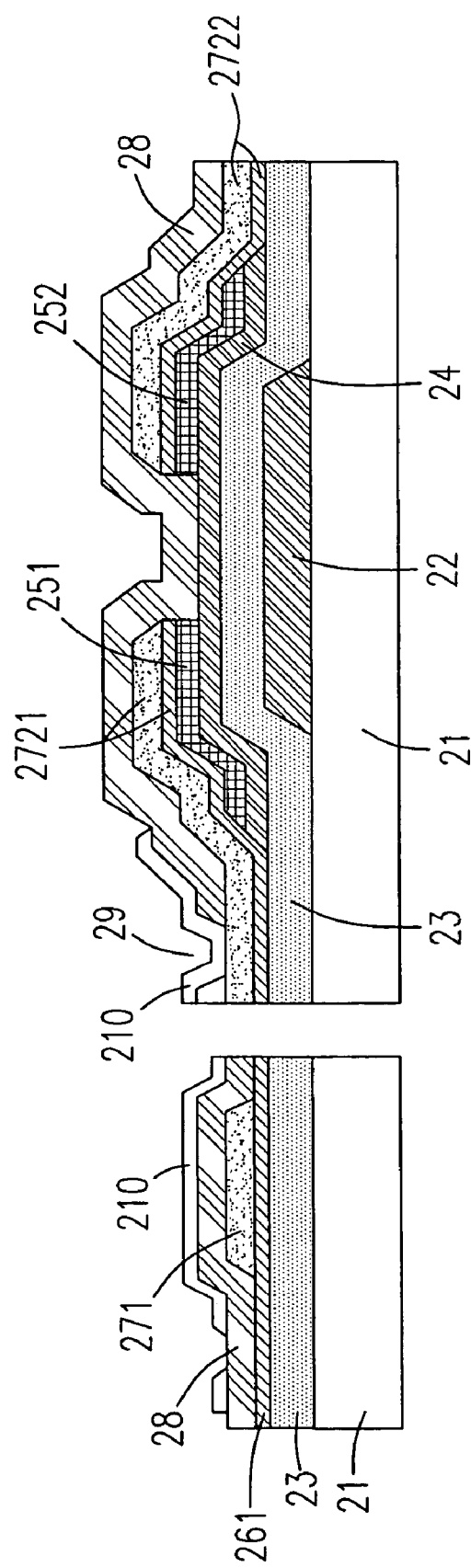

As shown in FIG. 3(e), firstly, the remained photo resistance layer 32 is removed. Then, a passivation layer 28 is formed all over the substrate 21. Next, a third pre-determined position of the passivation layer 28 is etched to form the contact hole 29. After that, a second ITO layer is formed all over the substrate 21, and then it is etched to form the pixel electrode 210.

Embodiment III

Figure 4A:
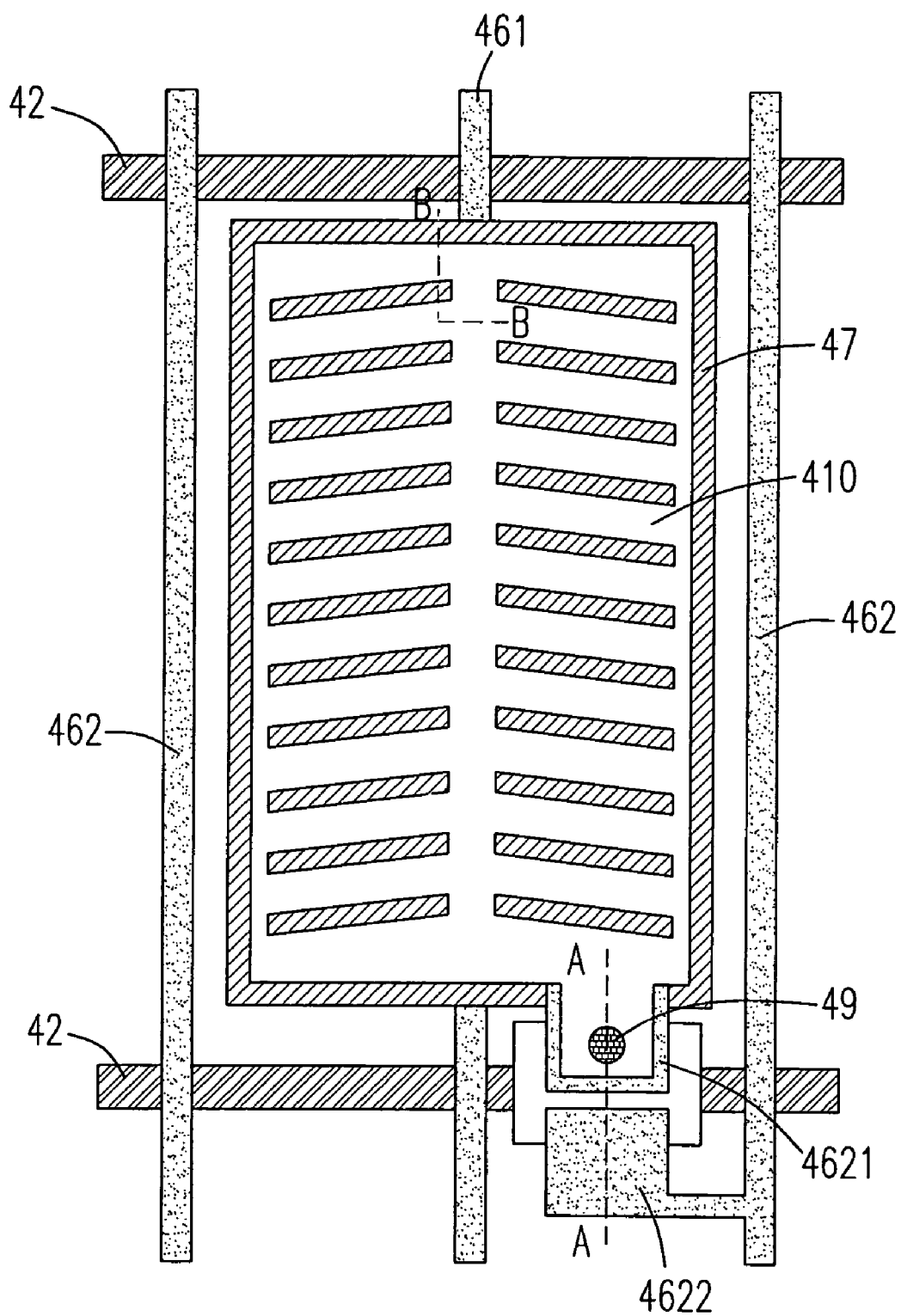
FIG. 4(a) is a top view of the array structure of the FFS mode LCD according to a third preferred embodiment of the present invention.
Figure 4B:
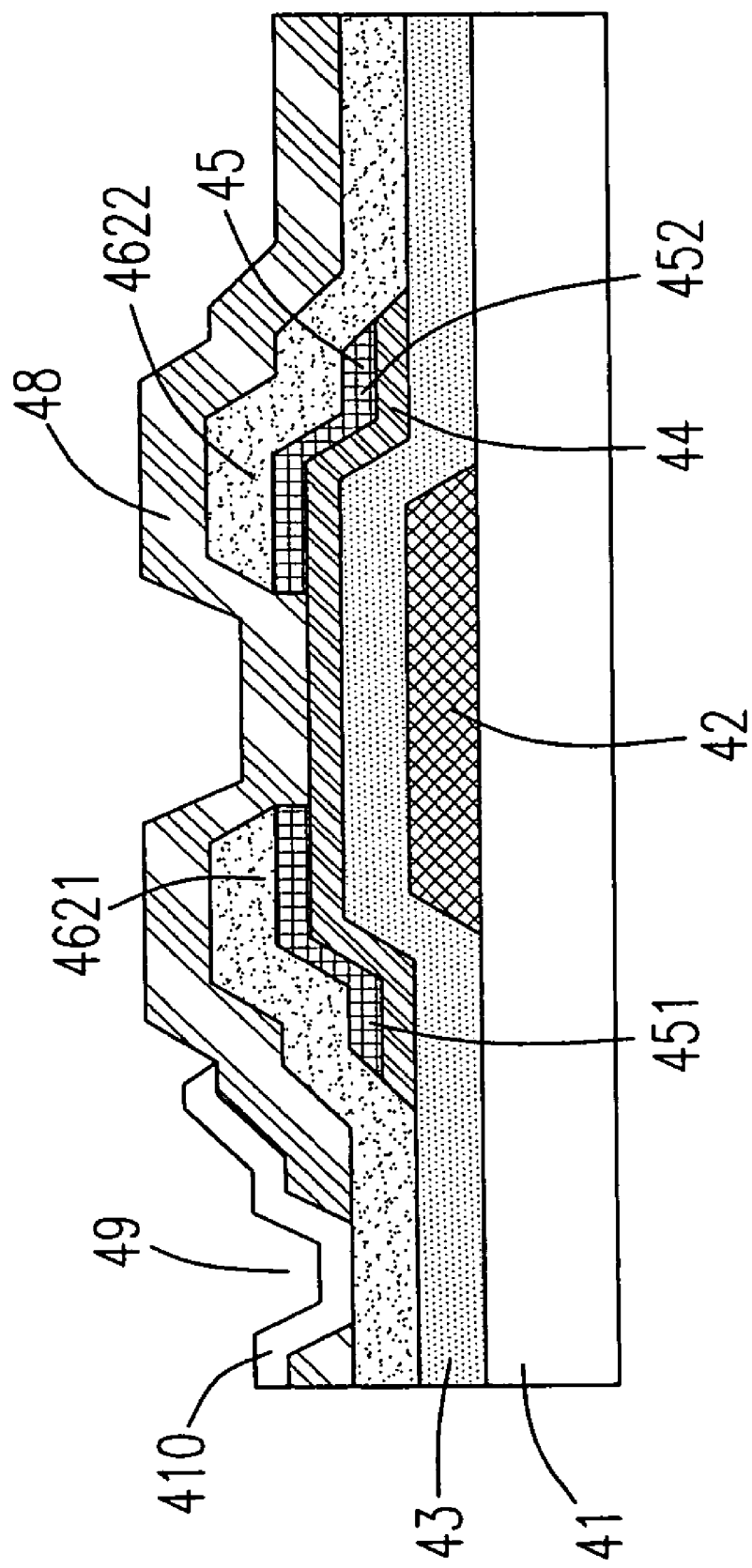
FIG. 4(b) is a cross-sectional view along A-A line of FIG. 4(a)
Figure 4C:
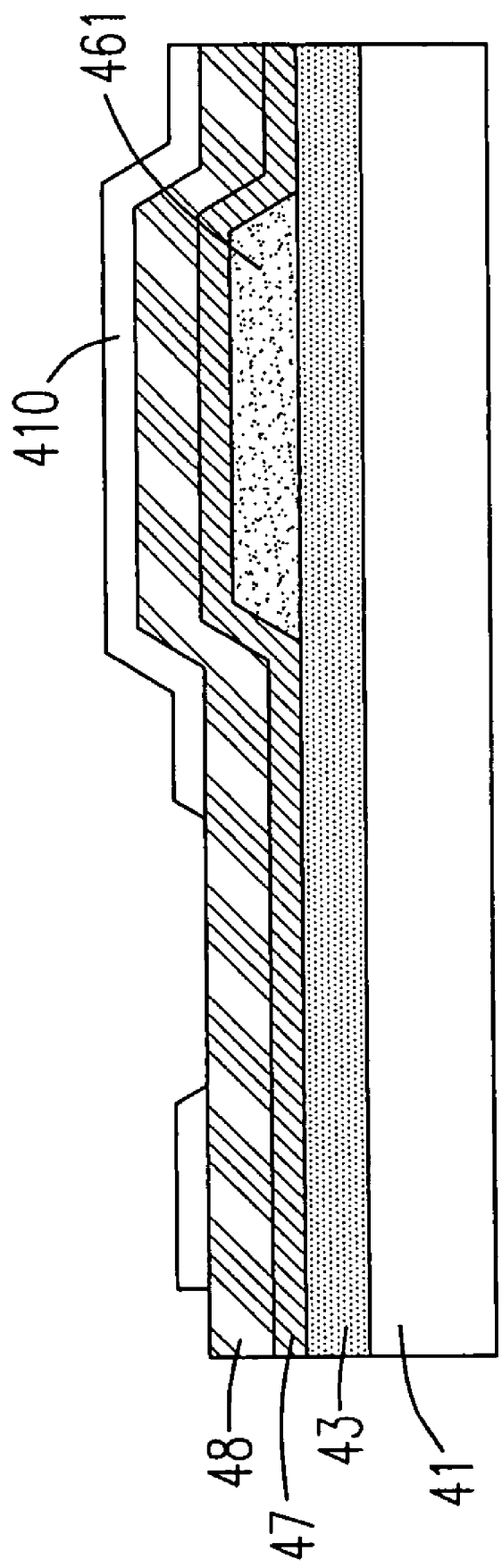
FIG. 4(c) is a cross-sectional view along B-B line of FIG. 4(a).

Please refer to FIG. 4(a), which shows a top view of the array structure of the FFS mode LCD according to a third preferred embodiment of the present invention. The FFS mode LCD includes a common electrode 47, a pixel electrode 410, a plurality of gate lines 42, a common line 461, a plurality of data lines 462 and a contact hole 49. Please refer to FIG. 4(b), which shows a cross-sectional view along A-A line of FIG. 4(a). As shown in FIG. 4(b), the manufacturing steps of the FFS mode LCD are as follows. Firstly, a substrate 41 is provided, and then the gate lines 42 and a gate insulating layer 43 are sequentially formed on the substrate 41. Next, a channel portion 44 and a doped portion 45 are sequentially formed on the gate insulating layer 43, wherein the doped portion 45 includes a first doped portion 451 and a second doped portion 452. After that, the data lines 462 and the common line 461 are simultaneously formed on the gate insulating layer 43, wherein the data lines 462 are connected to a second electrode 4622 (drain electrode) corresponding to the second doped portion 452, and a first electrode 4621 (source electrode) corresponding to the first doped portion 451 Subsequently, the common electrode 47 is formed on the common line 461. Next, a passivation layer 48 is formed on the common electrode 47, the first electrode 4621, the second electrode 4622 and above the whole substrate 41, and then the passivation layer 48 is etched to form the contact hole 49 on the first electrode 4621. Finally, the pixel electrode 410 is formed on the passivation layer 48 and covers the contact hole 49 to connect the first electrode 4621. The cross-sectional view along B-B line of FIG. 4(a) is shown in FIG. 4(c), wherein the common electrode 47 is formed on the common line 461.

In conclusion, through the method provided in the present invention, the number of dielectric layers between the common electrode and the pixel electrode on the LCD is reduced, and thus the image sticking is reduced accordingly. Therefore, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for manufacturing a liquid crystal display, comprising steps of:
   providing a substrate;
   forming a first metal layer on the substrate;
   etching the first metal layer to form a plurality of gate lines on the substrate;
   forming a common electrode on the substrate;
   forming a second metal layer on the substrate;
   etching the second metal layer to form a first electrode, a second electrode, a common line and a plurality of data lines on the substrate; and
   forming a pixel electrode overlapping the common electrode, wherein the gate lines intersect the data lines to form at least one enclosed area, the common electrode and the pixel electrode are positioned in the enclosed area, the first electrode is connected to the pixel electrode and the second electrode is connected to the data lines.

2. The method as claimed in claim 1, wherein the liquid crystal display is a fringe field switching liquid crystal display.

3. The method as claimed in claim 1, wherein the common electrode and the pixel electrode are transparent.

4. The method as claimed in claim 1, further comprising a step of:
   forming a gate insulating layer covering the gate lines and the substrate.

5. The method as claimed in claim 1, wherein the common line is parallel with the data lines.

6. The method as claimed in claim 1, further comprising a step of:
   forming a passivation layer positioned between the common electrode and the pixel electrode.

7. The method as claimed in claim 4, further comprising steps of:
   forming a semiconductor layer and a doped layer on the gate insulating layer and the substrate;
   forming a channel portion and a doped portion on one of the gate lines by etching the semiconductor layer and the doped layer sequentially;
   forming a first ITO layer on the doped portion and the gate insulating layer;
   forming the second metal layer on the first ITO layer;
   forming a photo resistance layer on the second metal layer; and
   totally etching a first pre-determined position of the photo resistance layer and partially etching a second predetermined position of the photo resistance layer via a half-tone technology process.

8. The method as claimed in claim 7, further comprising a step of:
   etching the first pre-determined position of the second metal layer and the first ITO layer to form the first electrode, the second electrode, and the common electrode, wherein the first pre-determined position is corresponding to one of the gate lines.

9. The method as claimed in claim 8, further comprising a step of:
   partially removing the photo resistance layer via a photo resistance ashing process, wherein the remained photo resistance layer is corresponding to the first electrode, the second electrode, and the common line.

10. The method as claimed in claim 9, further comprising steps of:
    etching the doped portion to form a first doped portion corresponding to the first electrode and a second doped portion corresponding to the second electrode; and
    etching the second metal layer to form the common line.

11. The method as claimed in claim 10, further comprising steps of:
    removing the remained photo resistance layer;
    forming a passivation layer all over the substrate;
    forming a contact hole by etching a third pre-determined position of the passivation layer;
    forming a second ITO layer all over the substrate; and
    etching the second ITO layer to form the pixel electrode.

12. The method as claimed in claim 8, further comprising a step of:
    etching the doped portion to form a first doped portion corresponding to the firs electrode and a second doped portion corresponding to the second electrode.

13. The method as claimed in claim 12, further comprising a step of:
    partially removing the photo resistance layer via a photo resistance ashing process, wherein the remained photo resistance layer is corresponding to the first electrode and the second electrode, and the common line is remained.

14. The method as claimed in claim 13, further comprising a step of:
    etching the second metal layer to form the common line.

15. The method as claimed in claim 14, further comprising steps of:
    removing the remained photo resistance layer;
    forming a passivation layer all over the substrate;
    forming a contact hole by etching a third pre-determined position of the passivation layer;
    forming a second ITO layer all over the substrate; and
    etching the second ITO layer to form the pixel electrode.

* * * * *